A. Sherwood.
Grain Binder.
Nº 19212 — Patented Jan. 26, 1858.
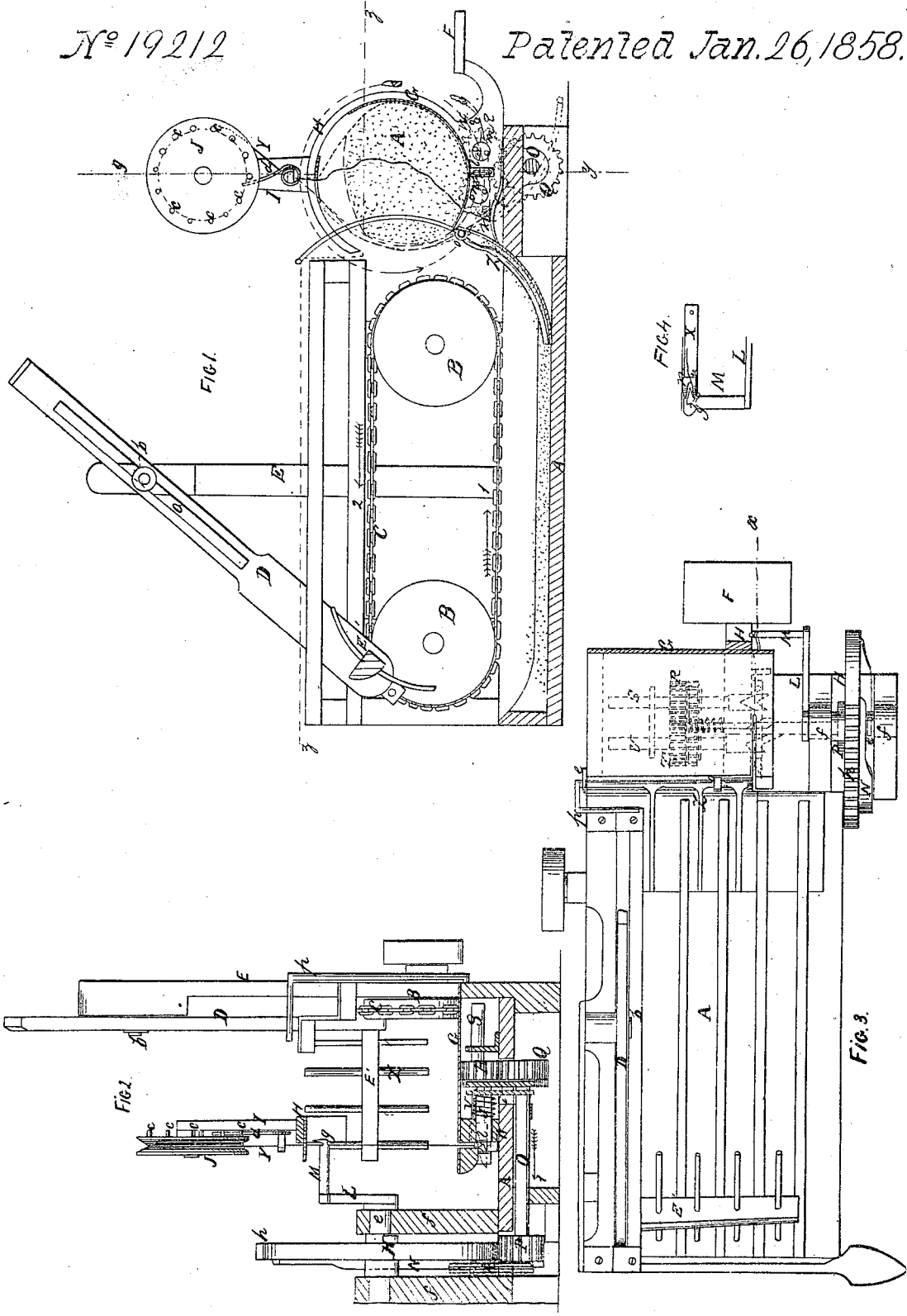

UNITED STATES PATENT OFFICE.

ALLEN SHERWOOD, OF AUBURN, NEW YORK.

IMPROVED RAKING AND BINDING DEVICES FOR HARVESTERS.

Specification forming part of Letters Patent No. 19,212, dated January 26, 1858.

*To all whom it may concern:*

Be it known that I, ALLEN SHERWOOD, of Auburn, in the county of Cayuga and State of New York, have invented a new and Improved Raking and Binding Device to be Attached to Harvesters; and I do hereby declare that the following is a full, clear, and exact description of the same, reference being had to the annexed drawings, making a part of this specification, in which—

Figure 1 is a vertical section of a harvester with my improvement applied to it; $x\ x$, Fig. 3, indicate the plane of section. Fig. 2 is a transverse vertical section of the same, taken in the line $y\ y$, Fig. 1. Fig. 3 is a horizontal section of the same, taken in the line $z\ z$, Fig. 1. Fig. 4 is a detached view of a portion of the binding device.

Similar letters of reference indicate corresponding parts in the several figures.

This invention consists in a peculiar arrangement of devices attached to a harvester for binding the grain, whereby, with the aid of an attendant, the work can be perfectly and readily done, and with a speed commensurate at all times or in any case with the cutting power of the machine to which the improvement is attached.

To enable those skilled in the art to fully understand and construct my invention, I will proceed to describe it.

A represents the platform of a harvester, and B B are two pulleys which are attached to a vertical framing at the back side of the platform, a pulley being near each end of the platform. Around the two pulleys B B an endless chain, C, passes, and to this chain the lower end of a bar, D, is secured. This bar D is slotted longitudinally, as shown at $a$, Fig. 1, and a pin, $b$, passes through the slot $a$ into a vertical post, E, attached to the framing at the back of the platform. To the lower end of the bar D a rake, E', is attached, said rake extending from the front to the back edge of the platform. One of the pulleys B is connected by any proper mechanism with the driving-wheel of the harvester, so that as the machine is drawn along the rake E' will travel the whole length of the platform, and quite near its surface when moving in the direction indicated by arrow 1, and be raised up free from the platform, or a suitable distance above it, when moving in the direction indicated by arrow 2, this movement of the rake being effected by the endless chain C and slotted bar D.

To one end of the platform A a seat, F, is attached, and a concave, G, is attached to the platform directly in front of the seat, said concave being secured to a curved bar, H, also attached to the platform. To the upper part of the curved bar H a vertical bar, I, is attached, said bar having a pulley or spool, J, attached to its upper part. The pulley J has a series of pins, $c$, projecting from it at one side near its periphery, at suitable and equal distances apart, and a spring, $d$, which is attached to the bar I, bears against either of said pins $c$.

K is a wheel, the axis $e$ of which is fitted in the upper ends of standards $f$, attached to the platform at its front side, and by the side of the concave G, a suitable space being allowed between the wheel and the end of the concave to allow an arm, L, and projecting bar M, which is attached to the arm L at right angles, to rotate. The arm L is attached to the axis $e$ of the wheel K, and the outer end of the projecting bar M is of hook form, as shown at $g$. (See more particularly Figs. 2 and 4.) The wheel K has a portion of its periphery, about one-half, toothed or cogged, as shown at $h$, and the outer side of the rim of the wheel is provided with a cam-shaped projection, N, the cam extending around the rim as far as the teeth $h$.

O is a shaft, which is placed underneath the platform A. This shaft has a pinion, P, on one end in the same plane with wheel K. On the opposite end of shaft O a pinion, Q, is placed, and this pinion Q gears into a pinion, R, on a shaft, S, just above shaft O. The pinion R gears into a corresponding pinion, T, on a shaft, U, which is parallel with shaft S. The three shafts O S U are allowed to slide in their bearings, and a plate, $i$, is attached to the shafts, said plate having a rod, $j$, secured to it, which rod is parallel with the shafts, and has a spiral spring, V, around it, said spring having a tendency to keep the shafts O S U thrown backward or off from the wheel K. To the outer end of shaft O an upright arm, $k$, is attached, against which the cam N acts in opposition to the spring V. To the outer end of the rod $j$ a cutter, $l$, is attached, and to the outer ends of both shafts S U pins are attached to form forks $m\ m'$, one of the prongs of the fork $m$, shaft U, being longer than the other, the prongs of the fork $m'$ being of equal length. The cutter $l$, as well as the forked ends of the shafts S U works through a ledge, W, which serves as a support to the bar H, and one end of the concave G. To the platform A, and directly below the front outer end of the concave G, a spring, X, is attached, the front end of the spring pressing up against a fork, $n$, attached to the ledge W.

Y is a wire, which is wound around the spool J, the lower end of the wire being secured in the fork $n$, in consequence of the end of the wire being twisted and not allowed to pass from between the prongs of the fork $n$.

Z is a rake, which is attached by eyes $o$ to the lower front end of the concave, and is provided at one end with a crank, $p$, by which it may be raised or lowered, the rake having such a relative position with the concave G that when it is raised the cut grain will be thrown into the concave.

The operation is as follows: As the machine is drawn along the rake E' will convey the grain to the rake Z, the grain being thrown upon rake Z by rake E'. When a sufficient quantity of grain to form a sheaf is upon the rake Z, the attendant, who sits upon the seat F, elevates the rake Z, and throws the grain that is upon it into the concave G, (see Fig. 1,) the grain being designated by A', the wire Y being moved or shoved back by the grain, as indicated by the line. (See more particularly Fig. 1.) The attendant then turns the wheel K by hand, and the hook $g$ at the end of bar M will catch the wire Y, and as the bar M is rotated, the hook $g$ will draw the wire Y down around the grain. The wire, by the action of the hook $g$, passes below the fork $n$, depressing the spring X, and one of the wires (shown and designated by $n'$) will be caught by the fork $n$, while the other, $n''$, will pass between the prongs of the forks $m\ m'$ and across the edge of the cutter $l$. When the portion $n''$ of the wire Y is passed across or through both forks $m\ m'$, the shafts S U are rotated as the teeth $h$ of wheel K then commence to gear into pinion P, and the cam projection N also acts against the arm $k$. The forks $m\ m'$ are, consequently, shoved outward in the direction indicated by arrow 1, and the portions of wire $n''$ and the other portion shown are twisted by the fork $m$, and form the band for the sheaf, the part $n''$ being cut as soon as the twist is given it by the knife $l$. A twist is also given the wire $n''$ by the fork $m'$, which serves as a knot or knob to retain the end of the wire in the fork $n$, for when the cutter $l$ severs the wire, as shown, the bound sheaf is cast or thrown from the concave G by the attendant, and the spring $d$, by acting against one of the pins $e$ of the pulley or spool J, draws up the wire Y to its original position, as shown, the spiral spring V throwing the shafts O S U back to their original position when the arm $k$ is relieved from the cam N. The attendant then again throws up the rake Z and fills the concave G with grain, which is bound as before.

I would remark that a guide-pin, $a^x$, is attached to ledge W, (see Fig. 1,) for the purpose of preventing the portion $n''$ of the wire from being drawn out of proper position, relatively, with the forks $m\ m'$ and cutter $l$.

Having thus described my invention, what I claim as new, and desire to secure by Letters Patent, is—

Binding the grain by means of the wire Y, placed on a spool or pulley, J, and carried partially around the grain by the hook $g$ of the arm M, the hooked arm being used in connection with the stationary fork $n$, and the rotating forks $m\ m'$ and cutter $l$, said parts being arranged to operate in relation to each other, as herein shown and described.

ALLEN SHERWOOD.

Witnesses:
JOSIAH SHERWOOD,
E. P. SENTER.